(12) United States Patent
Kim

(10) Patent No.: US 7,738,059 B2
(45) Date of Patent: Jun. 15, 2010

(54) THIN FILM TRANSISTOR PANEL HAVING PASSIVATION LAYER OVERLAPPING TFT WITH COLOR FILTER AND BLACK MATRIX FORMED ON PASSIVATION LAYER WHERE BLACK MATRIX PARTITIONS COLOR FILTER

(75) Inventor: Jang-soo Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 774 days.

(21) Appl. No.: 11/395,433

(22) Filed: Mar. 30, 2006

(65) Prior Publication Data

US 2006/0250536 A1     Nov. 9, 2006

(30) Foreign Application Priority Data

May 6, 2005   (KR) ............... 10-2005-0038058

(51) Int. Cl.
G02F 1/1333   (2006.01)
(52) U.S. Cl. ................... 349/110; 349/106
(58) Field of Classification Search .......... 349/106, 349/110, 111, 11
See application file for complete search history.

(56) References Cited

U.S. PATENT DOCUMENTS

| 5,943,107 | A  | * | 8/1999  | Kadota et al. ......... 349/44 |
| 7,046,315 | B2 | * | 5/2006  | Kim et al. ............ 349/44 |
| 7,250,236 | B2 | * | 7/2007  | Li et al. ............. 430/7 |
| 7,292,294 | B2 | * | 11/2007 | Hung et al. .......... 349/106 |

FOREIGN PATENT DOCUMENTS

| JP | 2004246289   | 9/2004 |
| KR | 1020020071542 | 9/2002 |
| KR | 1020040056172 | 6/2004 |

* cited by examiner

*Primary Examiner*—John Heyman
(74) *Attorney, Agent, or Firm*—Innovation Counsel LLP

(57) ABSTRACT

A thin film transistor panel, a liquid crystal display having the same, and a method of manufacturing the thin film transistor panel are provided. The thin film transistor includes a gate line formed on an insulating substrate in a predetermined direction, a data line crossing the gate line, a thin film transistor connected to the gate line and the data line, a black matrix formed to overlap at least a portion of the gate line, the data line, and the thin film transistor, a color filter formed in a region partitioned by the black matrix, and a pixel electrode formed on the color filter and electrically connected to the thin film transistor.

15 Claims, 8 Drawing Sheets

THIN FILM TRANSISTOR PANEL HAVING PASSIVATION LAYER OVERLAPPING TFT WITH COLOR FILTER AND BLACK MATRIX FORMED ON PASSIVATION LAYER WHERE BLACK MATRIX PARTITIONS COLOR FILTER

This application claims priority from Korean Patent Application No. 10-2005-0038058 filed on May 6, 2005 in the Korean Intellectual Property Office, the disclosure of which is incorporated herein by reference in its entirety.

BACKGROUND OF THE INVENTION

1. Field of the Invention

The present invention relates to a thin film transistor (hereinafter referred to as a TFT) panel, a liquid crystal display (hereinafter referred to as an LCD) having the same, and a method of manufacturing the TFT panel, and more particularly, to a TFT panel for an LCD, which has an improved structure and a simpler and cheaper manufacturing process, an LCD having the same, and a method of manufacturing the TFT panel.

2. Description of the Related Art

Recently, LCDs have been widely used as display units.

In a liquid crystal display device, when a voltage is applied to a liquid crystal cell, a molecular arrangement of the liquid crystal is changed to cause a change in optical properties. As a result, visual properties are changed to display various images. A liquid crystal display device has various advantages, including lightweight and compactness. As a result, the liquid crystal display device is widely used for a monitor of a computer, a mobile communications terminal, and so on.

Liquid crystal display devices are divided into to a TN (Twisted Nematic) type and an STN (Super-Twisted Nematic) type. The liquid crystal devices are also divided according to the driving type into an active matrix display type that uses a switching device, and a TN liquid crystal and a passive matrix display type using an STN liquid crystal.

The active matrix display type is used in a TFT-LCD and drives an LCD by using a TFT as a switching device. The passive matrix display type does not use any transistor and does not need a complex circuit.

In particular, due to the expanding range of applications for active-matrix LCDs and tremendous growth in the number of users, new technologies for reducing the number of production process steps, reducing the manufacturing cost, increasing yield, and improving quality have been continuously developed.

Representative technologies that have been recently developed and widely applied are called a patterned vertical alignment (PVA) mode LCD and a color-filter on array (COA) mode LCD.

COA is advantageous in reducing the number of process steps and increasing the open ratio of an LCD panel by forming a color filter, which is conventionally formed on an upper panel, on a lower panel. However, COA is disadvantageous in that a process of forming the color filter on the lower panel requires high precision, expensive exposure equipment.

In addition, when red (R), green (G), and blue (B) materials used in forming the color filter overlap with one another, a step difference such as a protrusion occurs in a region in which red (R), green (G), and blue (B) materials are bonded to one another, and when a margin is reduced to prevent overlapping, a valley occurs in the bonding region, so that the quality of image information displayed on an LCD is lowered.

SUMMARY OF THE INVENTION

The present invention provides a thin film transistor (TFT) panel having an improved structure, which has a cheaper and simpler manufacturing process, an LCD having the same, and a method of manufacturing the TFT panel.

The above stated objects as well as other objects, features and advantages, of the present invention will become clear to those skilled in the art upon review of the following description, the attached drawings and appended claims.

According to an aspect of the present invention, there is provided a TFT panel including a gate line, a data line, a thin film transistor, a black matrix, a color filter, and a pixel electrode, line formed on an insulating substrate in a predetermined direction, a data line crossing the gate line, a thin film transistor connected to the gate line and the data line, a black matrix formed to overlap at least a portion of the gate line, the data line, and the thin film transistor, a color filter formed in a region partitioned by the black matrix, and a pixel electrode formed on the color filter and electrically connected to the thin film transistor.

Here, the thin film transistor of the color filter is formed using an inkjet process.

At this time, the thin film transistor of the black matrix is formed of an organic material that is non-hygroscopic with respect to the color filter.

According to another aspect of the present invention, there is provided an a gate electrode connected to the gate line, a source electrode connected to the data line; and a drain electrode connected to the pixel electrode, wherein the pixel electrode and the drain electrode are electrically connected through a contact hole that perforates a portion of the black matrix that is formed in a region that overlaps the thin film transistor.

According to still another aspect of the present invention, there is provided a liquid crystal display including an upper panel on which a common electrode is formed, and a lower panel formed to face the upper panel and including a pixel electrode, a thin film transistor, a gate line, a data line, a black matrix, and a color filter formed in a region partitioned by the black matrix.

Here, the thin film transistor of the color filter is formed using an inkjet process.

At this time, the thin film transistor of the black matrix is formed of an organic material that is non-hygroscopic with respect to the color filter.

According to a further aspect of the present invention, there is provided a method of manufacturing a thin film transistor for a liquid crystal display, the method including forming a gate line on an insulating substrate in a predetermined direction, forming a data line to cross the gate line, forming a thin film transistor to be connected to the gate line and the data line, forming a black matrix to overlap at least a portion of the gate line, the data line, and the thin film transistor, forming a color filter in a region partitioned by the black matrix, and forming a pixel electrode on the color filter to be electrically connected to the thin film transistor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
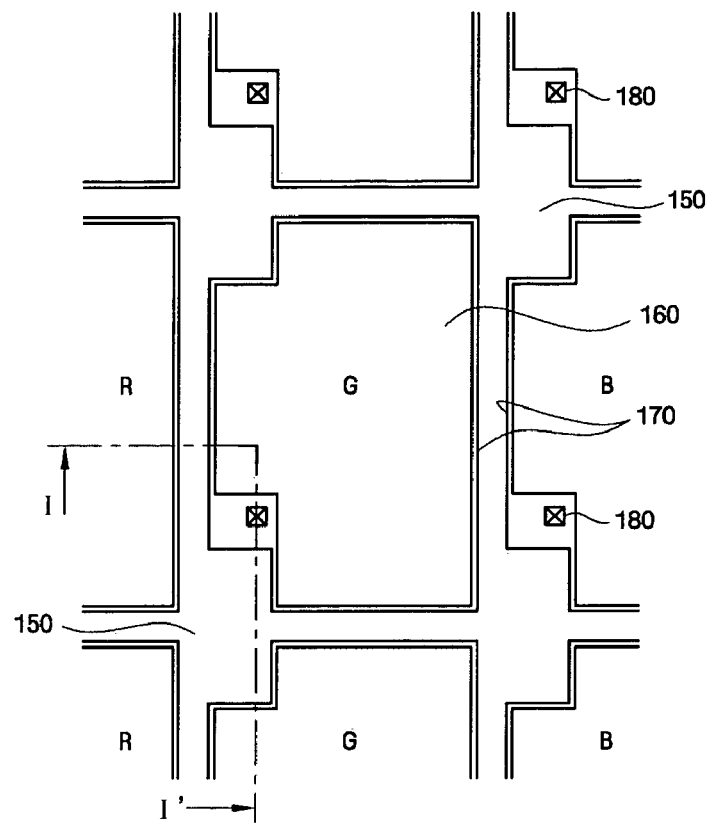
FIGS. 1A and 1B are a layout view and a partial cross-sectional view, respectively, of a thin film transistor (TFT) panel according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of this invention are shown.

Figure 1B:
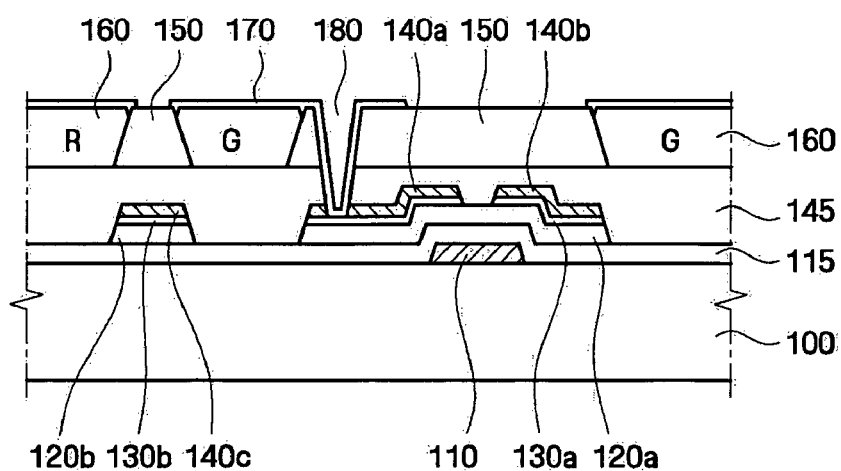

FIGS. 1A and 1B are a layout view and a partial cross-sectional view, respectively, of a thin film transistor (TFT) panel according to an embodiment of the present invention.

Referring to FIGS. 1A and 1B, a thin film transistor (TFT) panel for an LCD according to an embodiment of the present invention includes an insulating substrate 100, a gate layer 110, an interlevel dielectric (ILD) layer 115, active layers 120a and 120b, ohmic contact layers 130a and 130b, data layers 140a, 140b, and 140c, a passivation layer 145, a black matrix 150, a color filter 160, a pixel electrode 170, and a contact hole 180.

That is, the TFT panel shown in FIGS. 1A and 1B is constituted by planarizing the passivation layer 145 using chemical mechanical polishing (CMP), forming the black matrix 150 on the planarized passivation layer 145, and forming the color filter 160 using an inkjet process using the black matrix 150 as a barrier rib.

Accordingly, when the black matrix 150 is formed on the passivation layer 145 by precise patterning, the color filter 160 formed using an inkjet process will automatically have a precise overlay. Thus, a process of precisely patterning each of red (R), green (G), and blue (B) materials used in forming the color filter 160 using high-priced exposure equipment is not required so that a manufacturing process can be simplified and process costs can be reduced.

Here, the black matrix 150 may be formed of an organic material that is non-hygroscopic with respect to the color filter 160, so that the black matrix 150 is not wetted with dye or pigment ingredients used in forming the color filter 150.

The pixel electrode 170 to be formed on the color filter 160 electrically contacts a drain electrode 140a through the contact hole 180 that perforates a portion of the black matrix 150.

In this case, the gate layer 110 is disposed below the passivation layer 145, and the active layers 120a and 120b, the ohmic contact layers 130a and 130b and the data layers 140a, 140b, and 140c may be formed using a 4-mask or 5-mask process.

A method of manufacturing a TFT panel according to an embodiment of the present invention will now be described with reference to FIGS. 2A through 4D.

FIGS. 2A through 4D are layout views and partial cross-sectional views illustrating a method of manufacturing a thin film transistor (TFT) panel according to an embodiment of the present invention.

Figure 2A:
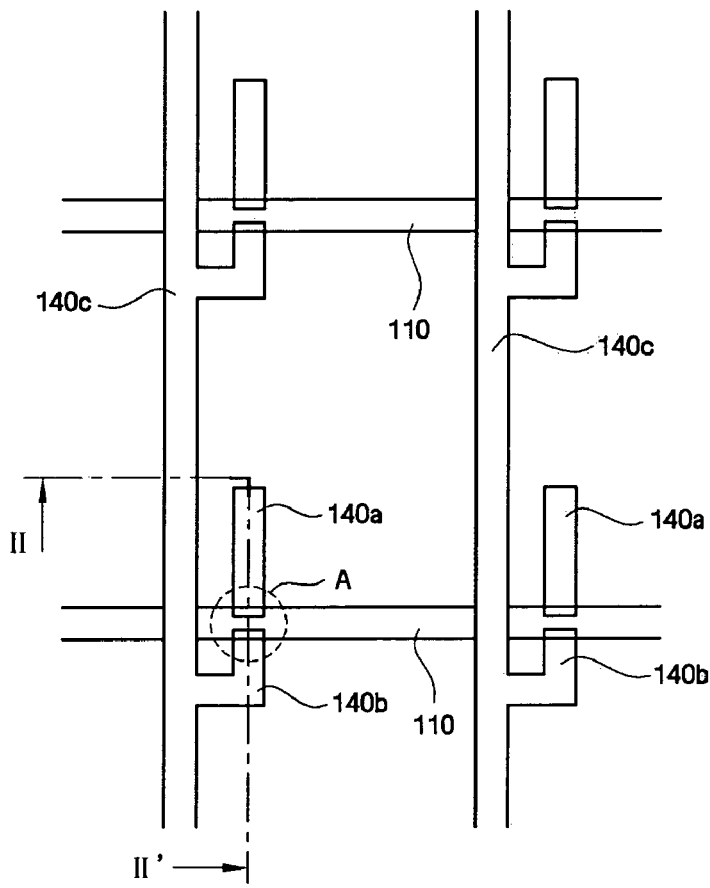
FIGS. 2A through 4D are layout views and partial cross-sectional views illustrating a method of manufacturing a thin film transistor (TFT) panel according to an embodiment of the present invention.
Figure 2B:
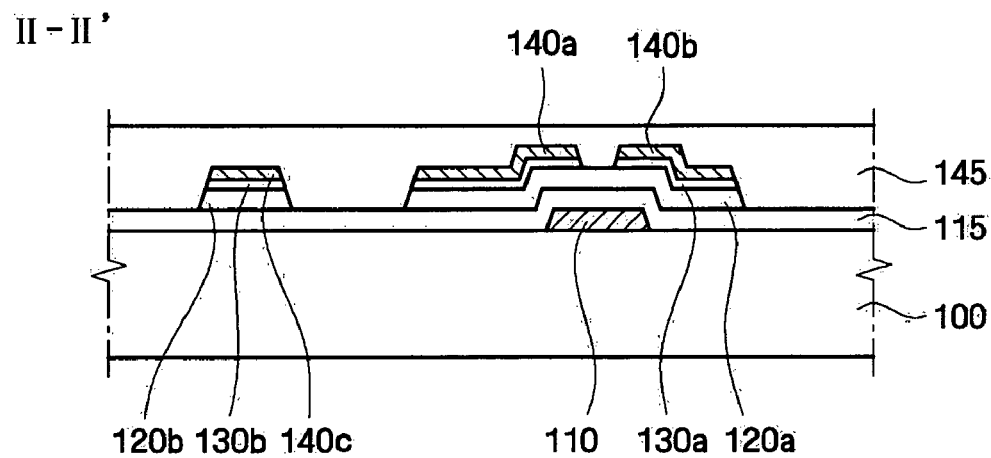

Referring to FIGS. 2A and 2B, the gate layer 110 is formed on the insulating substrate 100. The gate layer 110 forms a gate line or a gate electrode of a TFT A.

After the ILD layer 115 is formed to cover the gate layer 110, the active layers 120a and 120b, the ohmic contact layers 130a and 130b, and the data layers 140a, 140b, and 140c are sequentially stacked on the ILD layer 115.

In this case, while an overall shape of the active layers 120a and 120b, the ohmic contact layers 130a and 130b, and the data layers 140a, 140b, and 140c patterned by a general 4-mask process is shown in the drawings, this is only an example used for the convenience of explanation, and these layers may be formed in a variety of shapes using a 3-mask or 5-mask process.

The data layers 140a, 140b, and 140c comprise the drain electrode 140a and the source electrode 140b of the TFT A, and the data line 140c.

Subsequently, the passivation layer 145 is formed using a material such as $SiN_x$ to completely cover an exposed top surface, and then the top surface of the passivation layer 145 is planarized using a process such as CMP.

A detailed description of the configuration and function of the active layers 120a and 120b and the ohmic contact layers 130a and 130b will be omitted.

Figure 3A:
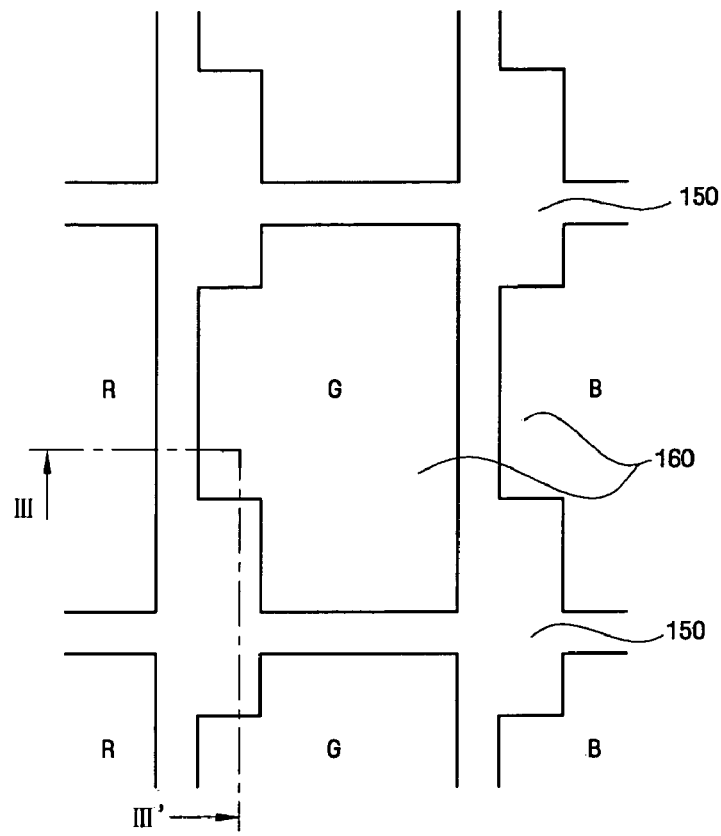
Figure 3B:
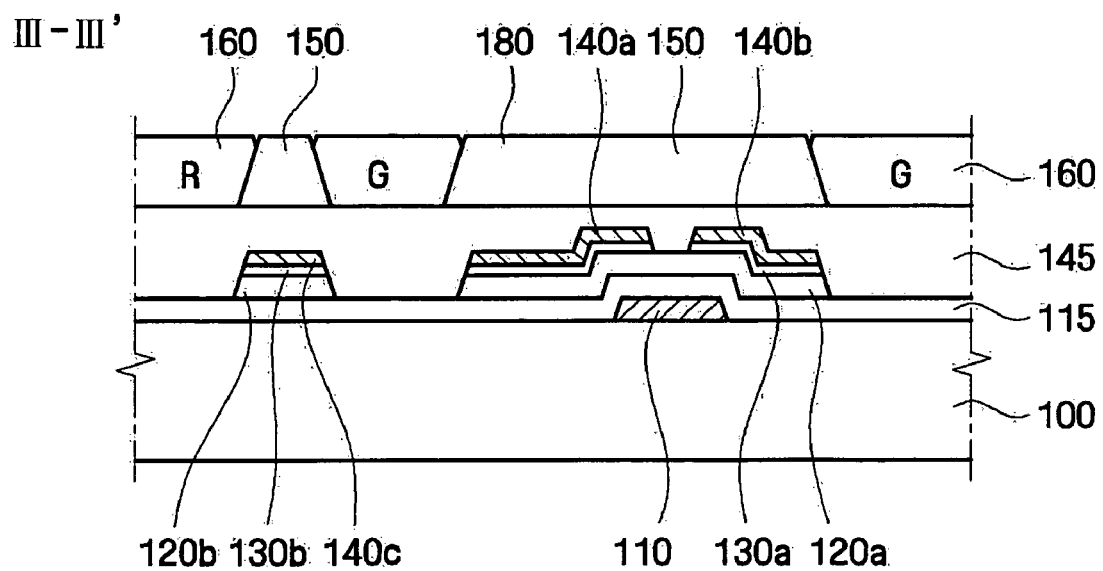

Referring to FIGS. 3A and 3B, the black matrix 150 is formed on the planarized passivation layer 145. The black matrix 150 may be formed to precisely overlap the data line 140c, the gate line, and the TFT A using a precise patterning process to prevent light from shining through.

Subsequently, the color filter 160 representing R, G, and B colors is formed in an internal space partitioned by the black matrix 150, using the black matrix 150 as a barrier rib. Since the precisely-patterned black matrix 150 serves as the barrier rib, the color filter 160 may be formed using a simple process such as an inkjet process.

Thus, the black matrix 150 may be formed of an organic material that is non-hygroscopic with respect to the color filter 160.

Figure 4A:
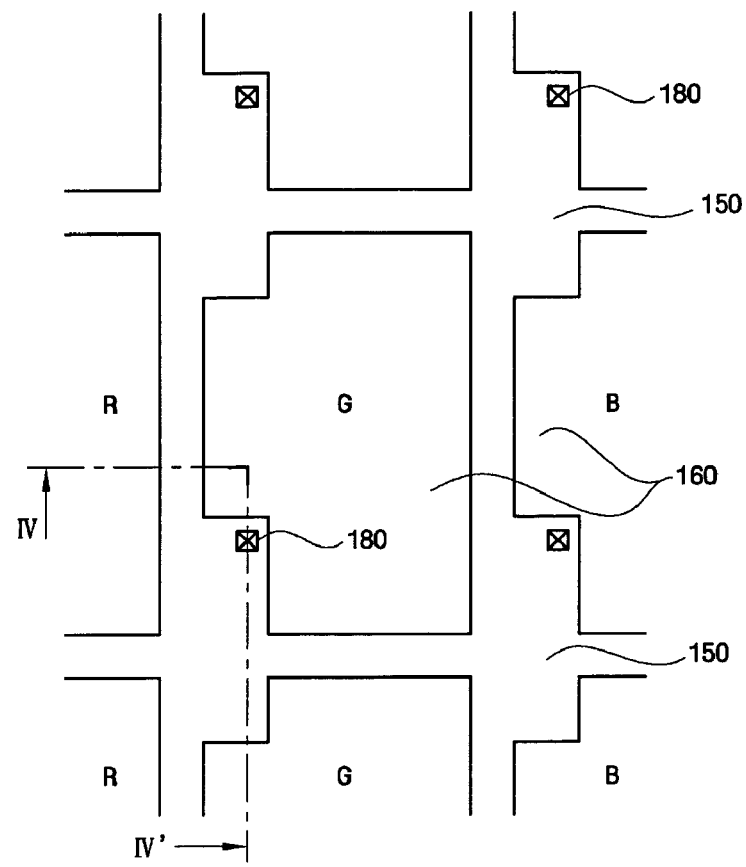
Figure 4B:
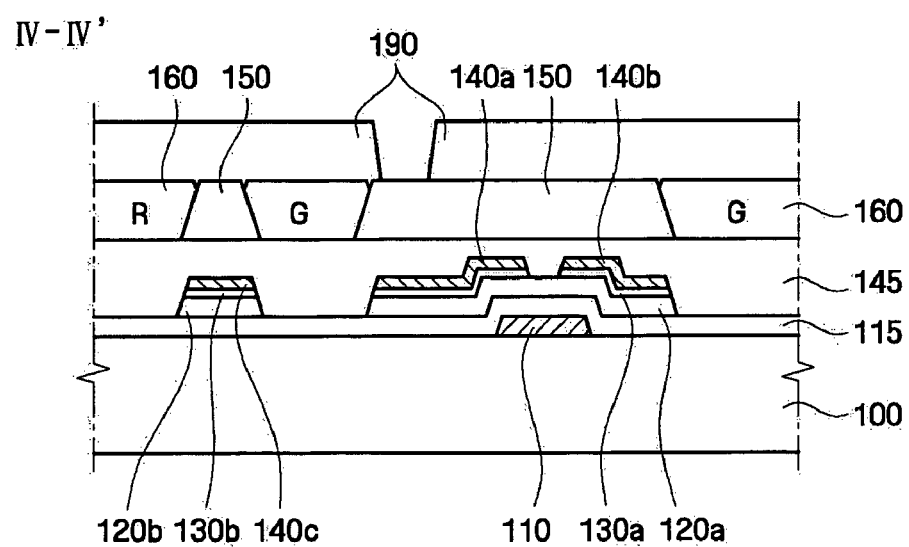

Referring to FIGS. 4A and 4B, a photoresist (PR) or an organic layer 190 is formed on the black matrix 150 and the color filter 160. The PR or the organic layer 190 is patterned to form the contact hole 180 which exposes a portion of the drain electrode 140a of the TFT A.

Figure 4C:
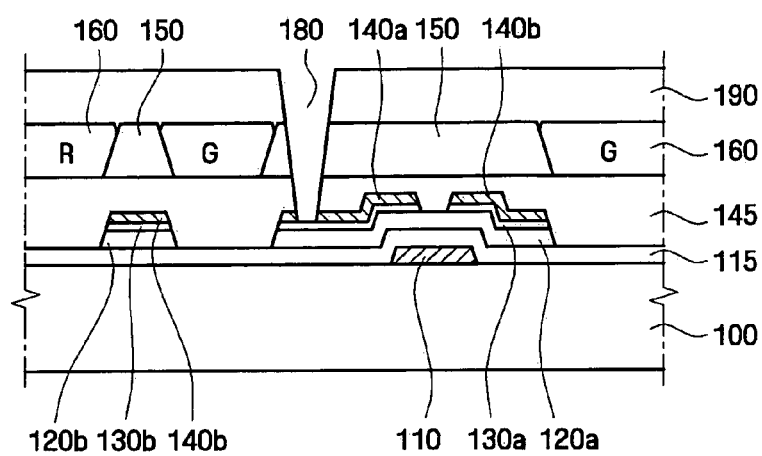

Thus, referring to FIG. 4C, the contact hole 180 is formed using the PR or the organic layer 190 as a mask using a dry etching process so that the drain electrode 140a is exposed through the contact hole 180.

Figure 4D:
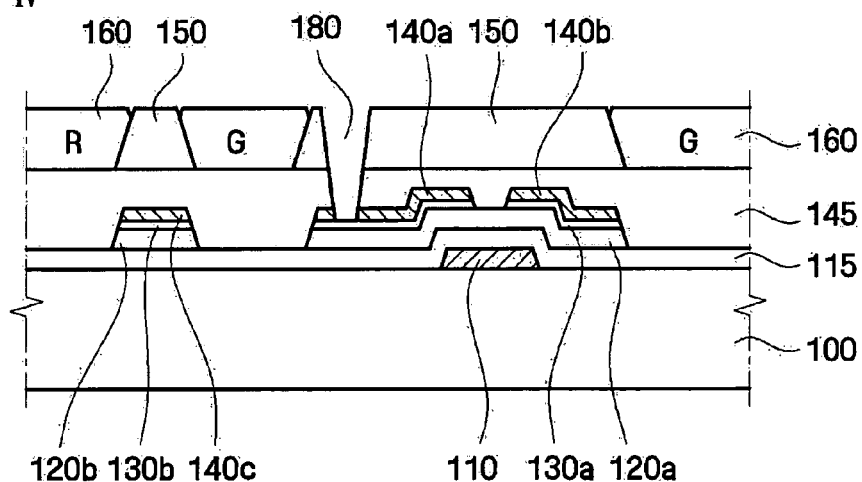

Subsequently, the material 190 formed above the black matrix 150 and the color filter 160 can be removed using a removal process, as shown in FIG. 4D. Such a removal process may be further performed when the material 190 is a PR.

After the contact hole 180 is formed, the pixel electrode 170 that contacts the drain electrode 140a through the contact hole 180 and covers an upper portion of the color filter 160 is formed, which completes the manufacturing of the TFT panel.

The layout view and cross-sectional view of the TFT panel on which the pixel electrode 170 is formed are shown in FIGS. 1A and 1B.

Figure 5A:
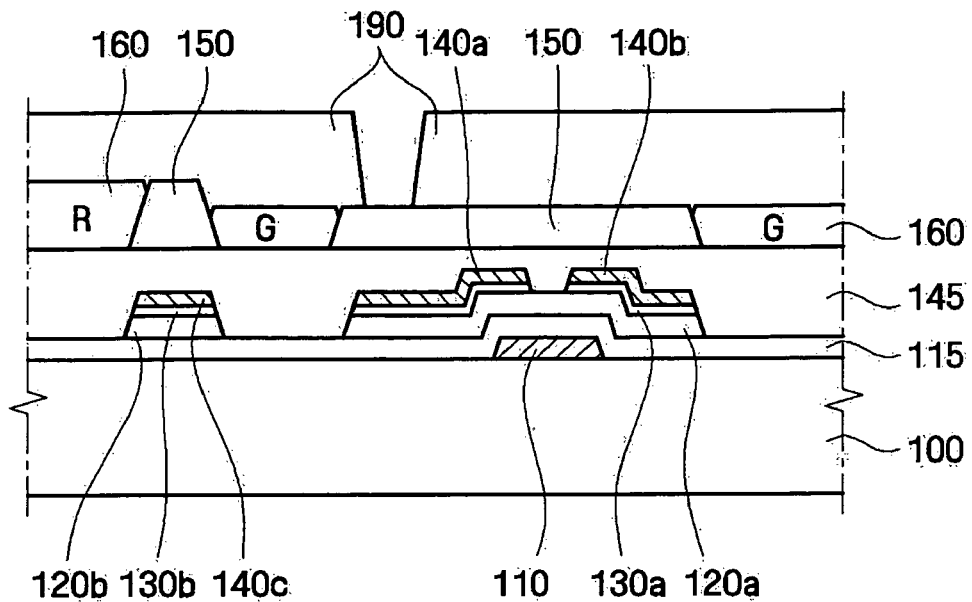
FIGS. 5A through 5C are cross-sectional views illustrating a variety of modified examples of a process of forming a black matrix on a thin film transistor (TFT) panel according to an embodiment of the present invention.
Figure 5B:
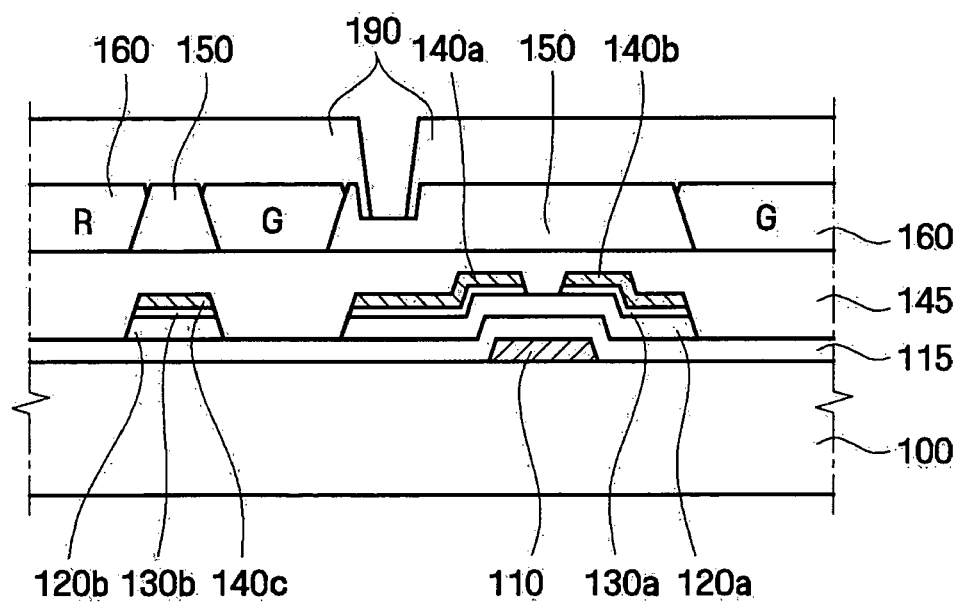
Figure 5C:
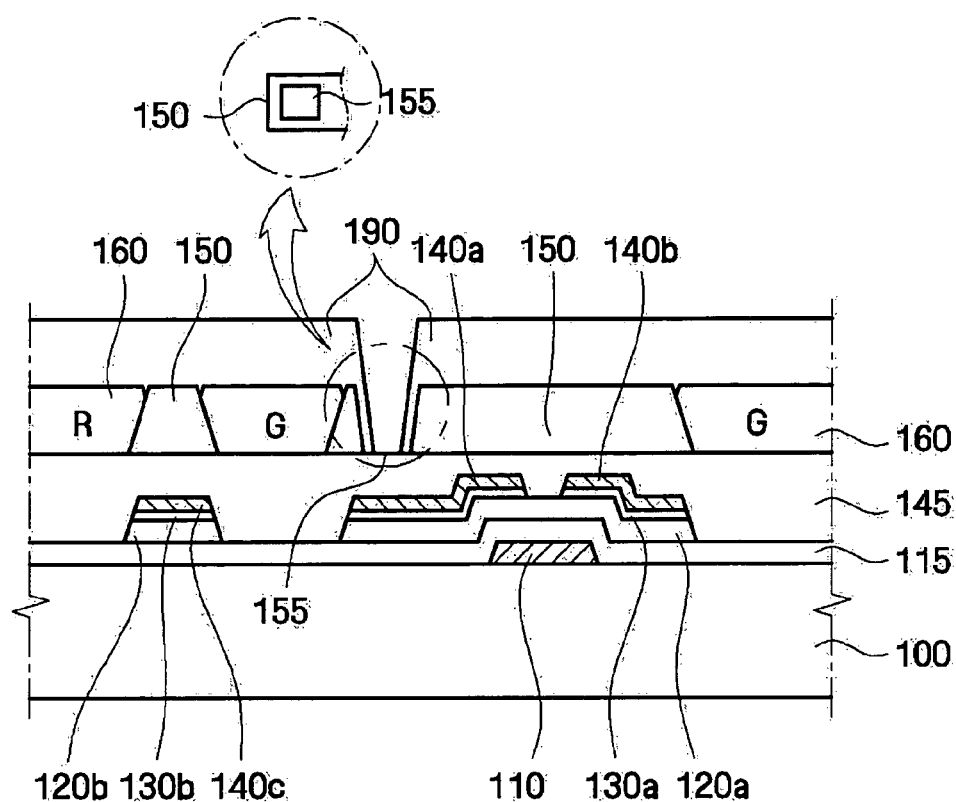

FIGS. 5A through 5C are cross-sectional views illustrating a variety of modified examples of a process of forming a black matrix on a thin film transistor (TFT) panel according to an embodiment of the present invention.

That is, when the TFT panel is manufactured using the processes shown in FIGS. 2A through 4D, the black matrix 150 to be etched in the dry etching process of forming the contact hole 180 is formed to a larger thickness so that the color filter 160 may be exposed to damages to the PR or the organic layer 190 formed on the black matrix 150 during the etching process.

To solve the problem, a shape in which the height of the black matrix 150 formed on the TFT A is smaller than that of the black matrix 150 formed on the data line 140c is proposed in FIG. 5A. Such a structure can be realized by forming the black matrix 150 on the TFT A using a slit-shaped mask.

FIG. 5B shows a structure in which only a portion of the black matrix 150 formed on the TFT A corresponding to the contact hole is formed using a slit mask.

Last, FIG. 5C shows a structure in which a region of the black matrix 150 formed on the TFT A corresponding to the contact hole is formed in a hollow 155. That is, an opening larger than the contact hole is first formed in the black matrix and then the material 190 is deposited and patterned to form the contact hole inside the hollow 155. When the hollow-shaped black matrix 150 is used, the material formed on the TFT A and the color filter 160 may be an organic layer.

Figure 6:
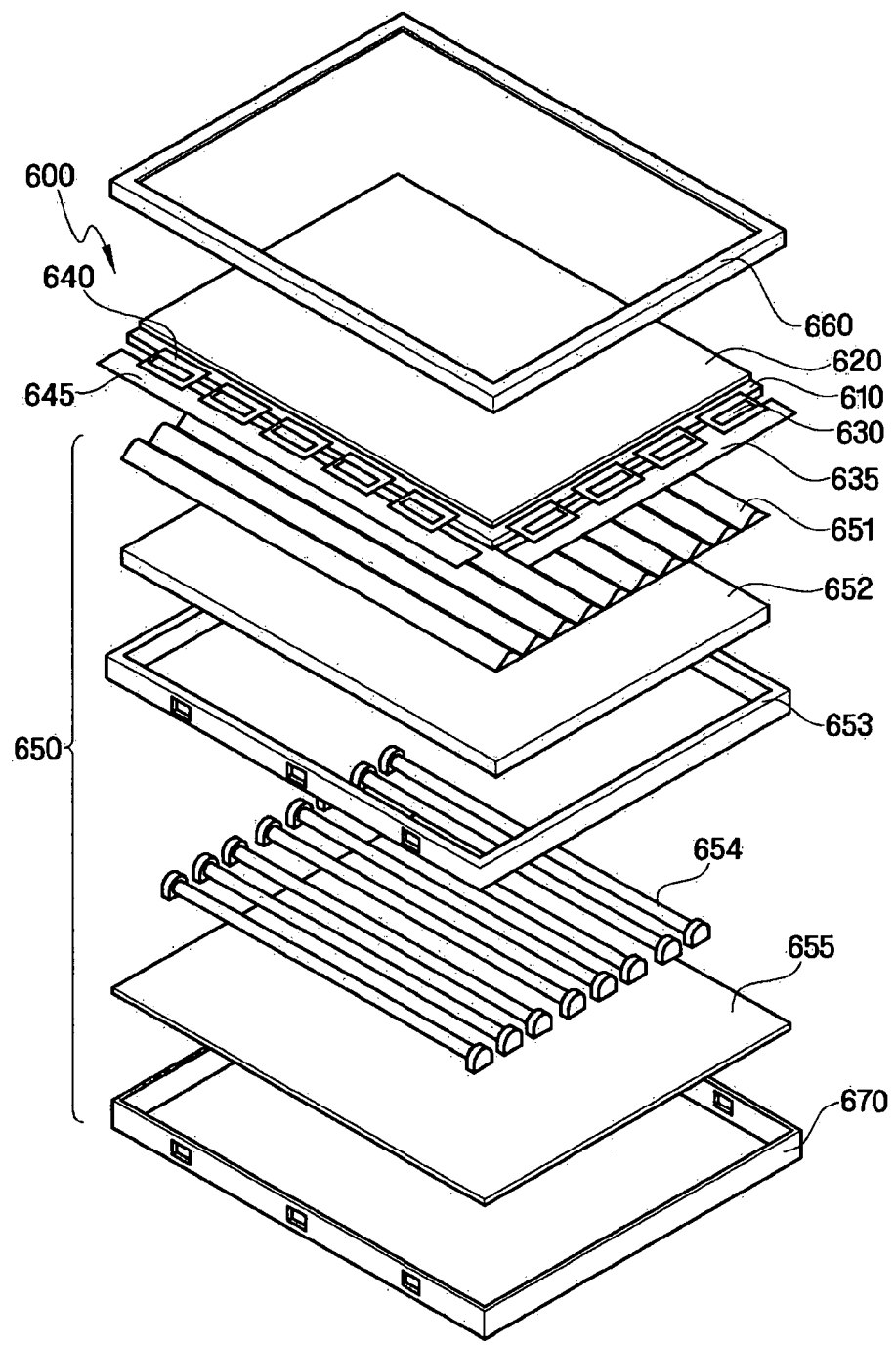
FIG. 6 is an exploded perspective view of a liquid crystal display (LCD) having a TFT panel according to an embodiment of the present invention.

FIG. 6 is an exploded perspective view of a liquid crystal display (LCD) having a TFT panel according to an embodiment of the present invention.

Referring to FIG. 6, an LCD according to an embodiment of the present invention includes an LCD panel 600, a backlight unit 650, and a top chassis 660.

The LCD panel 600 includes a lower panel 610, an upper panel 620, a liquid crystal (not shown), a tape carrier package (TCP) 630, a gate printed circuit board (PCB) 635, a data TCP 640, and a data PCB 645.

The lower panel 610 includes a gate line, a data line, a TFT, a black matrix, a color filter, and a pixel electrode. The upper panel 620 is located to face the upper portion of the lower panel 610 and includes a common electrode etc. but this is not shown. The lower panel 610 has a color-filter on array (COA) structure in which the passivation layer is planarized using CMP etc., the black matrix is formed on the planarized passivation layer, and the color filter is formed using an inkjet process using the black matrix as a barrier rib.

That is, the black matrix is formed using precise patterning so that the color filter can be formed in a region partitioned by the black matrix using a simple process such as an inkjet process. Thus, the black matrix may be formed of an organic material that is non-hygroscopic with respect to the color filter.

In addition, it has been previously described that in order to prevent the problem of the color filter being exposed when the process of forming the contact hole that perforates the black matrix is performed, a portion of the black matrix in which the contact hole is to be formed can be formed in a smaller thickness or in a step difference or hollow shape.

Subsequently, the gate TCP 630 is connected to each gate line formed in the lower panel 210, and the data TCP 640 is connected to each data line formed in the lower panel 210.

A plurality of circuit components which can process a gate driving signal and a data driving signal are mounted on the gate PCB 635 and the data PCB 645 so that the gate driving signal can be inputted to the gate TCP 630 and the data driving signal can be inputted to the data TCP 640.

The backlight unit 650 includes an optical sheet 651, a diffusion panel 652, a mold frame 653, a lamp 654, and a reflection panel 655.

That is, the lamp 654 irradiates light, and the reflection panel 655 is installed below the lamp 654 and reflects the light emitted from a lower portion of the lamp 654 toward the upper diffusion panel 652 of the reflection panel 655.

The light irradiated from the lamp 654 and the light reflected by the reflection panel 655 are diffused by the diffusion panel 652 to even out the brightness and then condensed by the optical sheet 651 such as a prism etc.

Components of the backlight unit 650 are received in an internal space partitioned by combining the mold frame 653 and a bottom chassis 670, and the bottom chassis 670 is combined with the top chassis 660 and forms the entire frame of the LCD.

In the LCD shown in FIG. 6, the backlight unit 650 is formed in a direct type. However, this is only an example and the backlight unit 650 used in the LCD may be formed in a variety of types, including a direct type, an edge type, a wedge type, and so on.

As described above, in the TFT panel for an LCD and the method of manufacturing the same according to the present invention, a process of manufacturing the TFT panel can be simplified and the costs for manufacturing the TFT panel can be reduced.

While the present invention has been particularly shown and described with reference to exemplary embodiments thereof, it will be understood by those skilled in the art that various changes in form and details may be made therein without departing from the spirit and the scope of the invention is defined by the following claims and equivalents thereof.

What is claimed is:

1. A thin film transistor panel comprising:
    a gate line formed on an insulating substrate in a predetermined direction;
    a data line crossing the gate line;
    a thin film transistor connected to the gate line and the data line;
    a passivation layer formed on the thin film transistor;
    a black matrix formed on the passivation layer to overlap at least a portion of the gate line, the data line, and the thin film transistor;
    a color filter formed in a region partitioned by the black matrix; and
    a pixel electrode formed on the color filter and electrically connected to the thin film transistor.

2. The thin film transistor panel of claim 1, wherein the color filter is formed using an inkjet process.

3. The thin film transistor panel of claim 2, wherein the black matrix is formed of an organic material that is non-hygroscopic with respect to the color filter.

4. The thin film transistor panel of claim 1, wherein the thin film transistor comprises:
    a gate electrode connected to the gate line;
    a source electrode connected to the data line; and
    a drain electrode connected to the pixel electrode,
    wherein the pixel electrode and the drain electrode are electrically connected through a contact hole.

5. The thin film transistor panel of claim 4, wherein the height of the portion of the black matrix in which the contact hole is formed is smaller than that of the black matrix formed in the region that overlaps the gate line or the data line.

6. The thin film transistor panel of claim 4, wherein the black matrix is formed to have a step difference between a region in which the contact hole is formed and a region other than the region in which the contact hole is formed.

7. The thin film transistor panel of claim 4, wherein the black matrix that is formed in the region in which the contact hole is formed has a hollow shape to receive the contact hole.

8. A liquid crystal display comprising:
an upper panel on which a common electrode is formed; and
a lower panel formed to face the upper panel and including:
a gate line formed on an insulating substrate in a predetermined direction;
a data line crossing the gate line;
a thin film transistor connected to the gate line and the data line;
a passivation layer formed on the thin film transistor;
a black matrix formed on the passivation layer;
a color filter formed in a region partitioned by the black matrix; and
a pixel electrode formed on the color filter and electrically connected to the thin film transistor.

9. The liquid crystal display of claim 8, wherein the black matrix is formed to overlap at least a portion of the thin film transistor, the gate line, and the data line.

10. The liquid crystal display of claim 8, wherein the color filter is formed using an inkjet process.

11. The liquid crystal display of claim 10, wherein the black matrix is formed of an organic material that is non-hygroscopic with respect to the color filter.

12. The liquid crystal display of claim 8, wherein the thin film transistor comprises:
a gate electrode connected to the gate line;
a source electrode connected to the data line; and
a drain electrode connected to the pixel electrode,
wherein the pixel electrode and the drain electrode are electrically connected through a contact hole that perforates a portion of the black matrix that is formed in a region that overlaps the thin film transistor.

13. The liquid crystal display of claim 12, wherein the height of the portion of the black matrix that is perforated by the contact hole and is formed in the region that overlaps the thin film transistor is smaller than that of the black matrix formed in the region that overlaps the gate line or the data line.

14. The liquid crystal display of claim 12, wherein the black matrix is formed to have a step difference between a region in which the contact hole is formed and a region other than the region in which the contact hole is formed.

15. The liquid crystal display of claim 12, wherein the black matrix that is formed in the region that overlaps the thin film transistor has a hollow shape to receive the contact hole.

* * * * *